United States Patent
Becker et al.

(10) Patent No.: US 9,248,433 B2
(45) Date of Patent: Feb. 2, 2016

(54) RAW MATERIALS FOR VANADIUM-FREE OR VANADIUM-REDUCED DENOX CATALYSTS, AND METHOD FOR PRODUCING SAME

(75) Inventors: Ralf Becker, Bottrop (DE); Gerhard Auer, Krefeld (DE); Frank Hipler, Krefeld (DE); Nicole Galbarczyk, Krefeld (DE); Kai-Sven Lange, Essen (DE); Horst Günnel, Kempen (DE); Uwe Dörschug, Tönisvorst (DE)

(73) Assignee: Sachtleben Pigment GmbH, Krefeld (DE)

( * ) Notice: Subject to any disclaimer, the term of this patent is extended or adjusted under 35 U.S.C. 154(b) by 26 days.

(21) Appl. No.: 14/116,365

(22) PCT Filed: Mar. 30, 2012

(86) PCT No.: PCT/EP2012/055810

§ 371 (c)(1), (2), (4) Date: Dec. 13, 2013

(87) PCT Pub. No.: WO2012/152506

PCT Pub. Date: Nov. 15, 2012

(65) Prior Publication Data

US 2014/0155256 A1    Jun. 5, 2014

(30) Foreign Application Priority Data

May 11, 2011    (EP) ..................................... 11165659

(51) Int. Cl.
*C01G 23/047* (2006.01)
*B01J 23/888* (2006.01)
(Continued)

(52) U.S. Cl.
CPC ........... *B01J 23/888* (2013.01); *B01D 53/9418* (2013.01); *B01J 21/063* (2013.01);
(Continued)

(58) Field of Classification Search
CPC .... B01J 21/063; B01J 21/066; B01J 35/1019; B01J 35/1023; B01J 37/00; C01G 23/047; C01G 23/0532
USPC ................. 502/304, 308, 309, 312, 316, 350; 423/615
See application file for complete search history.

(56) References Cited

U.S. PATENT DOCUMENTS 3,990,999 A    11/1976  Gasson et al.
4,085,193 A     4/1978  Nakajima et al.
(Continued)

FOREIGN PATENT DOCUMENTS

EP    0317875 A2    5/1989
EP    0410440 A1    1/1991
(Continued)

OTHER PUBLICATIONS

International application No. PCT/EP2012/055810, International Preliminary Report on Patentability, dated Nov. 2, 2013.
(Continued)

*Primary Examiner* — Patricia L Hailey
(74) *Attorney, Agent, or Firm* — Cahn & Samuels, LLP (57) ABSTRACT

A composition that comprises a titanium compound, an iron compound, and a tungsten compound, wherein the titanium compound has a microcrystalline anatase structure and/or is obtained in the production of TiO2 according to the sulphate process, during hydrolysis of a solution which contains titanyl sulphate, and also in that the composition has a vanadium content, calculated as V, of less than 0.15 wt. % in relation to the solids content of the composition. A catalyst or catalyst raw material containing the claimed composition, as well as to a dimensionally stable and catalytically active solid body can be obtained by mixing the composition defined above with binders, plasticisers and optionally, further additives, molding the obtained composition preferably by extrusion, and subsequently carrying out calcination, or by providing a dimensionally stable and catalytically active solid body that can be obtained by applying the composition, optionally together with binders, plasticisers and further additives, to a substrate, and subsequently carrying out calcination.

18 Claims, 3 Drawing Sheets

(51) Int. Cl.
*B01D 53/94* (2006.01)
*B01J 37/03* (2006.01)
*B01J 21/06* (2006.01)
*B01J 35/00* (2006.01)
*B01J 35/10* (2006.01)
*B01J 37/00* (2006.01)
*B01J 37/02* (2006.01)
*B01J 21/16* (2006.01)
*B01J 23/00* (2006.01)
*B01J 35/04* (2006.01)

(52) U.S. Cl.
CPC ......... *B01J35/0013* (2013.01); *B01J 35/1019* (2013.01); *B01J 37/0009* (2013.01); *B01J 37/0201* (2013.01); *B01J 37/033* (2013.01); *B01D 2251/2062* (2013.01); *B01D 2251/2067* (2013.01); *B01D 2255/2065* (2013.01); *B01D 2255/20707* (2013.01); *B01D 2255/20738* (2013.01); *B01D 2255/20776* (2013.01); *B01D 2255/9207* (2013.01); *B01D 2258/01* (2013.01); *B01D 2258/0291* (2013.01); *B01J 21/16* (2013.01); *B01J 23/002* (2013.01); *B01J 35/04* (2013.01); *B01J 37/0045* (2013.01); *B01J 2523/00* (2013.01)

(56) References Cited

U.S. PATENT DOCUMENTS

| | | | |
|---|---|---|---|
| 4,916,107 A | 4/1990 | Brand et al. | |
| 5,120,695 A | 6/1992 | Blumrich et al. | |
| 5,723,404 A | 3/1998 | Butje et al. | |
| 8,569,199 B2 | 10/2013 | Adelmann et al. | |
| 2005/0137082 A1 | 6/2005 | Nojima et al. | |
| 2006/0084569 A1* | 4/2006 | Augustine et al. | 502/309 |
| 2010/0209324 A1 | 8/2010 | Augustine | |
| 2010/0247409 A1 | 9/2010 | Collier et al. | |
| 2010/0304954 A1 | 12/2010 | Sogabe et al. | |
| 2011/0101265 A1 | 5/2011 | Kambara et al. | |
| 2012/0201732 A1* | 8/2012 | Augustine et al. | 423/239.1 |
| 2012/0288715 A1 | 11/2012 | Griebler et al. | |
| 2013/0115154 A1 | 5/2013 | Grothe et al. | |
| 2013/0244869 A1 | 9/2013 | Auer et al. | |

FOREIGN PATENT DOCUMENTS

| | | | |
|---|---|---|---|
| EP | 0956899 A1 | | 11/1999 |
| EP | 2123808 A1 | | 11/2009 |
| EP | 2522418 A1 | * | 11/2012 |
| WO | 2008049491 A1 | | 5/2008 |

OTHER PUBLICATIONS

International application No. PCT/EP2012/055810, International Search Report, dated Jun. 2012.

English Abstract of EP 0410440.

English Abstract of EP 0956899.

English Abstract of EP 2123808.

English Abstract of WO 2008049491.

\* cited by examiner

RAW MATERIALS FOR VANADIUM-FREE OR VANADIUM-REDUCED DENOX CATALYSTS, AND METHOD FOR PRODUCING SAME

This U.S. patent application is a national stage application of PCT/EP2012/055810 filed on 30 Mar. 2012 and claims priority of European patent document EP 11165659.1 filed on 11 May 2011, the entireties of which are incorporated herein by reference.

TECHNICAL FIELD

The invention relates to a composition which is suitable as raw material for the production of vanadium-free or vanadium-reduced DeNOx catalysts and comprises a titanium compound which is obtained in the production of $TiO_2$ according to the sulfate process during hydrolysis of a titanyl sulfate-containing solution and/or has a microcrystalline anatase structure, an iron compound and a tungsten compound, and also a process for producing the composition and dimensionally stable, catalytically active solid bodies which can be obtained from this composition and be used as catalyst for, for example, decreasing the amount of nitrogen oxides.

PRIOR ART

Combustion of fossil energy carriers is the basis of our energy generation and mobility. However, the presence of oxygen and also nitrogen-containing compounds, or atmospheric nitrogen, in the combustion process leads to formation of nitrogen oxides (NOx) which lead to considerable pollution of the environment and damage to human health. The catalytic conversion of the nitrogen oxides by means of ammonia into harmless nitrogen has been established for a long time. Supported catalysts play a particularly important role in the catalytic degradation of nitrogen oxides. Particular importance has been obtained by selective catalytic reduction (SCR) in which the nitrogen oxides are reduced by means of added nitrogen-containing compounds, preferably ammonia or urea, in the presence of a catalyst. The selective catalytic reduction of nitrogen oxides by means of ammonia ($NH_3$—SCR) can be summarized as follows:

$$4\,NO + 4\,NH_3 + O_2 \xrightarrow{\text{catalyst}} 4\,N_2 + 6\,H_2O.$$

In mobile applications, the ammonia required in this reaction is often generated by thermal decomposition of a nitrogen-containing starting compound directly upstream of the catalyst. Commercial catalysts for SCR are, in particular, noble metals, metal oxides and zeolites. An overview is given by Pio Forzatti, *Present status and perspectives in de-NOx SCR catalysis*, in: Applied Catalysis A: General 222 (2001) 221-236. An important catalyst system is the supported $WO_3$ or $V_2O_5$—$WO_3$ catalysts on a $TiO_2$ support, where the $TiO_2$ is normally present predominantly in the anatase form (see, for example, U.S. Pat. No. 5,723,404 or WO2006/044768).

Apart from the ever stricter laws relating to NOx emissions from machines or engines driven by fossil fuels, laws are increasingly also focusing on the catalyst components. Thus, efforts are being made to legally prohibit vanadium as catalyst constituent since under operating conditions it can volatilize and, owing to the fundamental toxicity of V-containing compounds, can lead to a potential hazard to human beings and the environment. Technical solutions to this problem are known. Thus, zeolite-based systems whose active components can be copper or iron have been described. Furthermore, mixed oxides which display catalytic activity in the selective catalytic reduction of nitrogen oxides have been documented. For example, the system described in WO2008/049491 A1 is based on a Ce/Zr mixed oxide.

Furthermore, it has been known for a long time that iron on $TiO_2$ displays some catalytic activity. Apart from the problems associated with vanadium, the aging resistance and the low-temperature activity of the established systems, in particular, represent a problem since, firstly, the V-containing systems display a greatly reduced catalytic activity at temperature stress. In addition, the catalyst has to meet evermore demanding requirements in respect of the low-temperature activity (above about 200° C.). Although Fe- and Cu-zeolites have been found to be quite effective SCR catalysts in defined applications, there are weaknesses in terms of the long-term stability and the demands made of the gas composition for the catalytic reaction. Last but not least, the high costs make it necessary to find solutions which can represent alternatives to the zeolitic systems. The systems described in the patent and technical literature are generally based on specialty chemicals which are well-defined and highly pure but, as a result, rather unimportant for large-scale industrial use.

SUMMARY OF THE INVENTION

In the light of this background, it is an object of the present invention to provide a raw material for the production of catalytically highly active and aging-resistant SCR catalysts which have a low vanadium content or are free of vanadium and can be obtained in a simple way in an economically attractive process even on a large industrial scale.

The object is achieved by a composition comprising a titanium compound, an iron compound and a tungsten compound, characterized in that the titanium compound is obtained in the production of $TiO_2$ according to the sulfate process during hydrolysis of a titanyl sulfate-containing solution and/or has a microcrystalline anatase structure and the composition has a vanadium content, calculated as V, of less than 0.15% by weight, preferably less than 0.05% by weight, more preferably less than 0.03% by weight, particularly preferably less than 0.01% by weight, based on the solids content of the composition.

The invention further relates to a catalyst or catalyst raw material containing the composition of the invention.

The object is alternatively achieved by provision of a dimensionally stable catalytically active solid body which is obtainable by mixing of the above-defined composition with binders, plasticizers and optionally further additives, shaping of the resulting composition, preferably by extrusion, and subsequent calcination, or by provision of a dimensionally stable catalytically active solid body which is obtainable by application of the above-defined composition, optionally together with binders, plasticizers and further additives, to a support and subsequent calcination.

The invention also relates to the use of the composition according to the invention and also of the dimensionally stable solid body according to the invention as catalyst or for producing a catalyst and a process for producing the composition by mixing the titanium compound which is obtained in the production of $TiO_2$ according to the sulfate process during hydrolysis of a titanyl sulfate-containing solution and/or has a microcrystalline anatase structure, an iron compound and a tungsten compound.

DETAILED DESCRIPTION OF THE INVENTION

The embodiments of the invention described below can be combined with one another in any way and in this way lead to particularly preferred embodiments.

The following detailed description discloses specific and/or preferred variants of the individual features according to the invention. It goes without saying that embodiments obtained by any combinations of two or more preferred embodiments are also according to the invention and generally even preferred.

Unless indicated otherwise, the terms "comprising" or "comprises" are used in the context of the present patent application to indicate that further components can optionally be present in addition to the components explicitly mentioned. However, the terms should also be interpreted as encompassing embodiments which consist only of the components mentioned, i.e. do not contain any further components other than those mentioned.

Unless indicated otherwise, all percentages are by weight. Percentages or other relative amounts indicated for a component defined by a generic term should be interpreted as referring to the total amount of all specific variants which come within the generic term. When a generically defined component is, in an embodiment of the invention, further specified as a specific variant coming under the generic term, this should be interpreted as indicating that no other specific variants coming under the general term are additionally present, so that the originally indicated total amount of all specific variants then relates to the amount of the one particular specific variant.

Composition of the Invention and Production of a Catalyst and of a Catalyst Raw Material The invention relates to the production of titanium dioxide-containing raw materials for catalysts which are suitable for reducing nitrogen oxide-containing combustion offgases by selective catalytic reduction, e.g. by means of ammonia, to nitrogen. In detail, the invention encompasses the following embodiments:

(1) Composition comprising a titanium compound, an iron compound and a tungsten compound, characterized in that the titanium compound is obtained in the production of $TiO_2$ according to the sulfate process during hydrolysis of a titanyl sulfate-containing solution and/or has a microcrystalline anatase structure and the composition has a vanadium content, calculated as V, of less than 0.15% by weight, preferably less than 0.05% by weight, more preferably less than 0.03% by weight, particularly preferably less than 0.01% by weight, based on the solids content of the composition.

(2) Composition according to (1), characterized in that the titanium compound which is obtained in the production of $TiO_2$ by the sulfate process during hydrolysis of a titanyl sulfate-containing solution and/or has a microcrystalline anatase structure makes up more than 50% by weight, preferably more than 70% by weight, particularly preferably more than 90% by weight, of all titanium-containing components of the composition.

(3) Composition according to (1) or (2), characterized in that the composition has a BET surface area of greater than 150 $m^2/g$, preferably greater than 200 $m^2/g$, particularly preferably greater than 250 $m^2/g$.

(4) Composition according to at least one of the preceding embodiments, characterized in that the iron compound is an organic iron compound, preferably ammonium iron(III) citrate, and/or the iron content, calculated as $Fe_2O_3$, is from 0.1 to 5% by weight, preferably from 0.2 to 3.5% by weight, based on the solids content of the composition.

(5) Composition according to at least one of the preceding embodiments, characterized in that the tungsten content, calculated as $WO_3$, is from 2 to 30% by weight, preferably from 5 to 25% by weight, preferably from 5 to 15% by weight, based on the solids content of the composition.

(6) Composition according to at least one of the preceding embodiments, characterized in that the composition contains a cerium compound and has a cerium content, calculated as $CeO_2$, of from 0.01 to 5% by weight, preferably from 0.1 to 3.5% by weight, particularly preferably from 0.5 to 2.5% by weight, based on the solids content of the composition.

(7) Composition according to at least one of the preceding embodiments, characterized in that the composition has a Zr content, calculated as $ZrO_2$, of less than 8% by weight, preferably less than 5% by weight, particularly preferably less than 1% by weight, based on the solids content of the composition.

(8) Composition according to at least one of the preceding embodiments, characterized in that the sulfate content of the composition is from 0.05% by weight to 3.5% by weight, preferably from 0.2% by weight to 3.0% by weight, particularly preferably from 0.5% by weight to 2.5% by weight.

(9) Composition according to at least one of the preceding embodiments, characterized in that the ratio of $Cl/TiO_2$ is less than 0.0005, preferably less than 0.0001.

(10) Composition according to at least one of the preceding embodiments, characterized in that it is present in the form of a suspension or paste.

(11) Process for producing a composition according to at least one of the preceding embodiments (1) to (10), which comprises mixing of a titanium compound which is obtained in the production of $TiO_2$ according the sulfate process during hydrolysis of a titanyl sulfate-containing solution and/or has a microcrystalline anatase structure, an iron compound and a tungsten compound.

(12) Process according to (11), characterized in that a water-soluble iron compound and/or a water-soluble tungsten compound is deposited on the titanium compound.

(13) Process according to embodiment (11) or (12), characterized in that the composition has not been subjected to any thermal treatment above 300° C. before being processed to form catalysts and a BET surface area of the composition of from 100 to 500 $m^2/g$, preferably from 200 to 400 $m^2/g$, is obtained.

(14) Use of a composition according to at least one of embodiments (1) to (10) for producing a catalyst.

(15) Catalyst or catalyst raw material containing a composition according to at least one of embodiments (1) to (10).

(16) Dimensionally stable, catalytically active solid body obtainable by (i) mixing of the composition according to at least one of embodiments (1) to (10) with binders, plasticizers and optionally further additives, shaping of the resulting composition, preferably by extrusion, and subsequent calcination or (ii) application of the composition according to one or more of embodiments (1) to (10), optionally together with binders, plasticizers and/or further additives, to a support material and subsequent calcination.

The particular aspect of the composition according to the invention and of the process for producing it is the use of a combination of titanium compounds, iron compounds and tungsten compounds, whereby the titanium compound is obtained in the production of $TiO_2$ by the sulfate process during hydrolysis of a titanyl sulfate-containing solution and/or has a microcrystalline anatase structure.

The titanium compound preferably has a BET surface area of greater than 150 $m^2/g$, preferably greater than 200 $m^2/g$, particularly preferably greater than 250 $m^2/g$, and consists of industrially easily accessible microcrystalline $TiO_2$.

As titanium compound, preference is given to using microcrystalline anatase titanium dioxide which can be or comprise not only pure $TiO_2$ but also be or comprise titanium oxide hydrate. The titanium oxide hydrate, also referred to as titanium dioxide hydrate or metatitanic acid, can be described by the chemical formulae $TiO(OH)_2$, $H_2TiO_3$ or $TiO_2 \times H_2O$ (where $0 < x \leq 1$).

However, the titanium compound, preferably the above-described titanium oxide hydrate, can also have a ratio determined by X-ray diffraction of titanium dioxide in the anatase form to titanium dioxide in the rutile form of greater than 90:10, particularly preferably greater than 99:1. The X-ray crystalline phases can be determined qualitatively and quantitatively by X-ray diffraction (see, for example, H. Kirschner and B. Koppelhuber-Bitschnau, Röntgenstrukturanalyse and Rietveldmethode, 5th edition, Friedr. Vieweg & Sohn Verlagsgesellschaft mbH, Braunschweig/Wiesbaden, 1994).

Particles of the titanium oxide hydrate can be obtained, for example, by hydrolysis of a titanyl sulfate solution containing sulfuric acid. Depending on the origin and composition of the titanyl sulfate solution containing sulfuric acid, a sulfuric acid suspension of titanium oxide hydrate which can additionally contain undesirable impurities, in particular heavy metals, is obtained in the hydrolysis. In general, one or more purification steps are therefore carried out in order to free the titanium oxide hydrate of undesirable impurities.

Preference is given to using titanium oxide hydrate formed by hydrolysis of titanyl sulfate which is obtained in the process for producing titanium dioxide according to the sulfate process. This process is described, for example, in Industrial Inorganic Pigments, 3rd edition, edited by Gunter Buxbaum, Wiley-VCH, 2005.

In this context, the term microcrystalline should be interpreted as meaning that the evaluation of the reflection widths of X-ray powdered diffraction patterns of the microcrystalline $TiO(OH)_2$ according to the Scherrer equation indicates an average dimension of the crystallites of 4-10 nm.

The microcrystalline material according to the invention can, as described above, be obtained by hydrolysis of a titanyl sulfate solution which contains sulfuric acid and is obtained in the process for producing titanium dioxide according to the sulfate process.

Amorphous titanium oxide hydrate, which in contrast to the microcrystalline material according to the invention displays very greatly broadened X-ray reflections and whose corresponding crystal domains have sizes of less than 4 nm, can be obtained by hydrolysis of, for example, a titanium alkoxide, e.g. $Ti(OEt)_4$.

Highly crystalline materials such as A-K-1 from Crenox GmbH can be obtained by thermal treatment of microcrystalline or amorphous $TiO(OH)_2$ and have crystallite sizes according to the Scherrer evaluation of greater than 10 nm. Typical properties of A-K-1 are crystallite sizes of about 20 nm and a BET surface area of about 90 $m^2/g$.

It has surprisingly been found that, in particular, the use of microcrystalline $TiO(OH)_2$ as starting material for the production of catalytically active material is advantageous compared to an amorphous $TiO_2$ or a highly crystalline $TiO_2$.

The sulfate content of the titanium compound or of the titanium oxide hydrate is preferably up to 2.5% by weight, based on $TiO_2$. Thus, the sulfate content can be from 0.5 to 2.5% by weight, preferably from 1.5 to 2.5% by weight, based on $TiO_2$, but also less than 0.5% by weight.

The titanium compound, e.g. the titanium oxide hydrate, or the composition preferably has a BET surface area of greater than 150 $m^2/g$, preferably greater than 200 $m^2/g$, particularly preferably greater than 250 $m^2/g$. The maximum BET surface area of the titanium compound is preferably 500 $m^2/g$. The determination of the BET surface area is carried out in accordance with DIN ISO 9277 by means of $N_2$ at 77 K on a sample of the titanium oxide hydrate particles which has been degassed and dried at 140° C. for 1 hour. Evaluation is carried out by multipoint determination (10-point determination).

The composition of the invention has preferably been obtained by applying the iron compound and tungsten compound to a $TiO_2$-containing support, preferably using water-soluble compounds.

The composition of the invention preferably comprises sodium and the mass ratio of Na/Ti, expressed as $Na_2O/TiO_2$, is preferably less than 0.001, particularly preferably less than 0.0001.

The composition of the invention also preferably comprises compounds of the elements Si or Mn or combinations of these elements as further additives.

In the composition of the invention, the proportion of $SiO_2$ can preferably be from 0 to 15% by weight, particularly preferably from 5 to 10% by weight, and/or the proportion of manganese, reported as $MnO_2$, can preferably be from 0 to 20% by weight, preferably from 1 to 10% by weight, preferably from 2 to 5% by weight.

The composition of the invention can be subjected to a thermal treatment at above 300° C. before being processed to form catalysts, and the BET surface area of the composition after the thermal treatment is preferably from 10 to 250 $m^2/g$, particularly preferably from 50 to 150 $m^2/g$.

As an alternative, the composition of the invention is not subjected to any thermal treatment at above 300° C. before being processed to form catalysts, and the BET surface area of the composition is in this case preferably from 100 to 500 $m^2/g$, particularly preferably from 200 to 400 $m^2/g$.

The production of the composition of the invention preferably starts out from titanium oxide hydrate which is provided as aqueous suspension with a catalytically active component by means of, for example, an impregnation process. The catalytically active components or promoters iron and tungsten of the composition are introduced or deposited on the titanium oxide hydrate via a water-soluble compound, e.g. ammonium iron citrate or ammonium paratungstate, which is converted by thermal treatment into the respective oxide. It is inconsequential whether an oxidic, a hydroxidic or the pure precursor compound or mixed forms of these three species have been deposited on the $TiO(OH)_2$ as a consequence of loading.

After the deposition, a pH of preferably 2-9, particularly preferably from 3 to 7.5, is obtained or set.

Typically, the $TiO(OH)_2$ suspended in water is admixed while stirring with the respective metal oxide precursors. The addition can be carried out as solids or as an aqueous solution of the corresponding metal salts. The order of addition can be chosen freely and it is also possible to dissolve the respective metal salts together beforehand and then add them to the $TiO(OH)_2$ suspension. The treatment of the $TiO(OH)_2$ with the metal salts merely requires it to be ensured that no undissolved constituents of the metal salts remain in the suspension before drying of the composition of the invention, since this would prevent deposition of the metal salts on the $TiO(OH)_2$. After addition of the metal salts, it has to be ensured that precipitation of, for example, metal hydroxides does not occur as a result of changes in the pH, since this would likewise prevent very homogeneous deposition of the metal species on the $TiO(OH)_2$. It may therefore be necessary to correct the pH, e.g. by means of ammonia or sulfuric acid, depending on the metal salts selected. The duration and temperature of the treatment of the $TiO(OH)_2$ with the metal salts depend, in the case of addition of the salts in solid form, on the solubility of the metal salts. Thus, in the case of readily soluble compounds such as the ammonium iron citrate and ammonium paratungstate salts used in the examples, it may be sufficient to stir the mixture for 30 minutes at room temperature. Longer treatment times do not display any adverse effect on the catalytic properties. A composition according to the invention is obtained after the treatment with the metal salts. For use of the composition for producing all-active DeNOx catalysts obtained by extrusion, it can be necessary to free the composition of water and to convert the metal salts into the corresponding oxides. Removal of the water can be carried out in various ways. Thus, both removal by distillation by means of a rotary evaporator on the laboratory scale and evaporation in, for example, glass or metal vessels in a drying oven (130° C. at atmospheric pressure) have been found to be useful. Industrially, it is possible to employ spray drying or spin flash drying. The water content can likewise be reduced by filter pressing before the calcination.

Before use as catalyst, it merely has to be ensured that the catalytically active species are generated. This is generally ensured by means of a calcination step. This calcination can, for example, be carried out in a rotary tube furnace by means of indirect heating or else by means of direct heating. A hydrothermal calcination step can likewise produce the catalytically active species. Static calcinations, for example in a muffle furnace, and also highly dynamic calcinations, e.g. by means of short-duration calcination with residence times of from less than one second up to a few tens of seconds in pulse reactors, can be useful for obtaining the catalytically active species.

The invention makes it possible to obtain compositions or catalyst raw materials and catalysts which display a high thermal stability. In this context, it can be advantageous to apply stabilizing substances to the $TiO_2$ in order to increase the thermal stability. Possible target compounds here are $SiO_2$, $Al_2O_3$ or, for example, $P_2O_5$. In the present case, $SiO_2$ has, by way of example, been precipitated onto the $TiO(OH)_2$. Subsequent impregnation steps then allow introduction of catalytically active or structurally stabilizing components. Metal oxides which have a positive influence on the catalytic activity and/or thermal stability are, for example, the oxides of tungsten, of iron, of cerium, of silicon and/or of manganese.

When, for example, $SiO_2$ is introduced by precipitation from $NaSiO_3$, additional filtration and washing steps may be necessary before application of a further catalytically active or structurally stabilizing component.

The Dimensionally Stable Catalytically Active Solid Body

To produce the dimensionally stable solid body according to the invention from the composition of the invention, the latter is mixed with organic binders and optionally plasticizers (e.g. alkali metal stearates) and further additives such as glass fibers, preferably in the presence of water, in order to produce a ceramic paste. The composition is in this case preferably used in an amount of from 60 to 90% by weight, in particular from 70 to 80% by weight, based on the resulting mixture.

As binders and/or thixotropes, it is possible to employ sheet silicates such as bentonite and kaolin. Typical examples of these minerals having sheet-like structural units (phyllosilicates) are serpentine $Mg_3(OH)_4[Si_2O_5]$, kaolinite $Al_2(OH)_4[Si_2O_5]$, and also montmorillonite as main mineral of bentonite.

Further additives which can be used in the mixture comprise, for example, glass fibers for structural reinforcement (e.g. in a proportion of from 5 to 15% by weight), acrylic polymers as binders, cellulose or cellulose derivatives as swelling agents/plasticizers, ammonium hydroxide, organic acids such as lactic acid or oxalic acid as solubilizers and/or complexing agents and also amino alcohols such as aminomethylpropanol or monoethanolamine for adjusting the pH.

In the further processing of the resulting mixture of the catalyst raw material according to the invention and the binders and optionally plasticizers and further additives, a distinction can essentially be made between two variants, namely between production of all-active catalysts and the production of coated catalysts in which the catalytically active powder is applied to a solid support.

For the purposes of the present invention, an all-active catalyst is a dimensionally stable solid body which is made entirely or throughout of the above-described mixture of the catalyst raw material according to the invention and the binders and optionally plasticizers and further additives. For the purposes of the invention, "dimensionally stable" means essentially "nonpulverulent" and self-supporting. For this purpose, this mixture is preferably kneaded and then brought to a particular shape, preferably by extrusion or pressing. The mixture is particularly preferably extruded to form a ceramic monolith, which can be described as a solid honeycomb body. Here, the channels can assume any geometric shapes known to those skilled in the art. The channels are generally square in cross section and not hexagonal, as the name would suggest. Preference is given to dimensionally stable solid bodies having a support material content of at least 80% by weight based on the total mass.

After extrusion or pressing, the solid body is dried and subsequently calcined. The honeycomb bodies obtained in this way preferably have a wall thickness of from 0.5 to 2 mm and a channel width of from 3 to 10 mm.

In the case of use as raw material for all-active catalysts produced by extrusion, in particular, excessively high BET surface areas can lead to processing problems in the kneading and/or extrusion process. The BET surface area can be reduced to the preferred range from 50 to 150 $m^2/g$ by calcination at, for example, temperatures of 550° C. for one hour.

In the production of coated catalysts, the following procedure is employed: the composition of the invention, optionally together with binders, plasticizers and/or further additives, is applied to a support material and subsequently dried and calcined. The support material can be a geometric body, preferably shape-imparting and optionally perforated plates, e.g. of paper or ceramic, or metal or metal meshes. Ceramic honeycomb bodies which are typically used and can act as support material for coating with the composition of the invention consist, for example, of cordierite.

Uses in Catalysis

The compositions and shaped bodies of the invention are well-suited as catalysts.

The catalyst raw material of the invention and products derived therefrom are very well suited to use in processes for removal of nitrogen oxides from flue gas (DeNOx) as denitration catalyst for efficient catalytic reduction of nitrogen oxides ($NO_x$) in offgases by means of nitrogen-containing compounds, preferably ammonia or nitrogen-containing starting compounds which are converted into ammonia during or shortly before the reaction with $NO_x$, with particularly preference here being given to urea. Use in the selective catalytic reduction (SCR) of nitrogen oxides by means of ammonia according to $$4\,NO + 4\,NH_3 + O_2 \xrightarrow{\text{catalyst}} 4\,N_2 + 6\,H_2O$$

is of particular interest here. Fields of use are, in the mobile sector, motor vehicles, passenger cars, goods vehicles, ships and, in the stationary sector, for instance power stations, coal-fired power stations, gas-fired power stations, domestic waste incineration plants, plants for nitric acid production or processing, steelworks.

The invention provides, in particular, for the use of the dimensionally stable solid body of the invention as catalyst for decreasing the amount of nitrogen oxides, in particular for selective catalytic reduction (SCR) including fast SCR, in which the following reactions occur:

$2NH_3+NO+NO_2 \rightarrow 2N_2+3H_2O$ (NO and $NO_2$ in offgas, fast)

$8NH_3+6NO_2 \rightarrow 7N_2+12H_2O$ (only $NO_2$ in offgas, slower)

Particular preference is given to the use of the catalyst of the invention in a motor vehicle, particularly preferably in combination with an oxidation catalyst, preferably downstream.

EXAMPLES

DeNOx catalyst powders of the invention are produced via simple aqueous impregnation steps which are described by way of example in examples 1-4. The $SiO_2$ was introduced by precipitation from $NaSiO_3$, as a result of which a filtration and washing step was necessary.

Production Examples

Production Example 1

Ti—W—Fe Material 3036 g of an about 25% strength suspension of the microcrystalline $TiO(OH)_2$ according to the invention are admixed while stirring with 247.19 g of ammonium paratungstate. After stirring for about 30 minutes, 75 g of ammonium iron citrates are likewise added while stirring. The mixture is subsequently stirred further for about 30 minutes. After removal of the solvent on a rotary evaporator and drying in a drying oven at 130° C. for 2 hours, the composition according to the invention is obtained as powder.

Production Example 2

Ti—W—Fe—Ce Material 950 g of an about 15% strength suspension of the microcrystalline $TiO(OH)_2$ according to the invention are admixed while stirring with 22.47 g of ammonium paratungstate. After stirring for about 30 minutes, 68.47 g of cerium(III) acetate are likewise added while stirring. The mixture is subsequently stirred further for about 30 minutes and 20.23 g of ammonium iron citrate are then added while stirring. After stirring for another 30 minutes, the solvent is removed on a rotary evaporator and drying is carried out at 130° C. in a drying oven for 2 hours.

Production Example 3

Ti—W—Fe—Si Material 87.75 g of Na water glass solution (27.66% of $SiO_2$) are added over a period of 5 minutes to 1943 g of a 10% strength suspension of the microcrystalline $TiO(OH)_2$ according to the invention. After the addition, a pH of 6.0 is set. After filtration, the residue is washed with hot water until a final conductivity of the filtrate of <70 μS/cm has been achieved. The solid obtained is suspended in about 1 l of water and admixed while stirring with 83.41 g of ammonium paratungstate. After about 30 minutes, 33.37 g of ammonium iron citrate are added. The mixture is stirred further for about 30 minutes and the solvent is removed from the resulting suspension by distillation on a rotary evaporator. After drying at 130° C. in a convection drying oven for 2 hours, the composition according to the invention is obtained as powder.

Production Example 4

Ti—W—Fe—Si—Ce Material 70.67 g of Na water glass solution (27.66% of $SiO_2$) are added over a period of 5 minutes to 1565 g of a 10% strength suspension of the microcrystalline $TiO(OH)_2$ according to the invention. After the addition, a pH of 6.0 is set. After filtration, the residue is washed with hot water until a final conductivity of the filtrate of <70 μS/cm has been achieved. The solid obtained is suspended in about 1 l of water and admixed while stirring with 75.72 g of ammonium paratungstate. After about 30 minutes, 126.22 g of $Ce(NO_3)_3$ are added. After about 30 minutes, 30.30 g of ammonium iron citrate are added while stirring. The mixture is stirred further for about 30 minutes and the suspension obtained is freed of the solvent by distillation on a rotary evaporator. After drying at 130° C. in a convection drying oven for 2 hours, the composition according to the invention is obtained as powder.

Production Example XI (Comparative Example)

Ti—W—Fe on Amorphous TiO(OH)$_2$

Precursor: Titanyl Sulfate 534.51 g of a titanyl sulfate solution (having a TiO$_2$ content of, calculated, 9.23%) are brought to a pH of 6.5 by means of 25% strength ammonia solution. The suspension formed is stirred for a further 30 minutes, filtered and washed until the conductivity is below 70 µS/cm. The material obtained in this way is admixed with water and 14.65 g of ammonium paratungstate are added while stirring to 531 g of this suspension (containing about 8.08% of TiO$_2$). After a further 30 minutes, 8.33 g of ammonium iron citrate are added. After further stirring for 30 minutes, the suspension is freed of the solvent by distillation and subsequent drying in a drying oven.

Production Example X2 (Comparative Example)

Ti—W—Fe on Amorphous TiO(OH)$_2$

Precursor: Tetraethyl Orthotitanate (TEOT)

250 ml of TEOT are admixed with 2730 ml of ethanol. A mixture of 150 ml of ethanol/2830 ml of H$_2$O is slowly added dropwise to this solution while stirring. After the addition is complete, the mixture is stirred for one hour and the residue is subsequently filtered off and washed with ethanol. The filter residue is slurried with water to give an about 20% strength suspension. 442 g of this suspension are admixed while stirring with 12.66 g of ammonium paratungstate. After a further 30 minutes, 7.17 g of ammonium iron citrate are added. After further stirring for 30 minutes, the suspension is freed of the solvent by distillation and subsequent drying in a drying oven.

Production Example X3 (Comparative Example)

Ti—W—Fe on Amorphous TiO(OH)$_2$

Precursor: Tetraethyl Orthotitanate (TEOT) with Addition of H$_2$SO$_4$ 442 g of this suspension are admixed with 0.64 g of 96% strength H$_2$SO$_4$ and stirred for 30 minutes. 12.66 g of ammonium paratungstate are subsequently added while stirring. After a further 30 minutes, 7.17 g of ammonium iron citrate are added. After further stirring for 30 minutes, the suspension is freed of the solvent by distillation and subsequent drying in a drying oven.

Production Example X4 (Comparative Example)

Ti—W—Fe on Highly Crystalline TiO$_2$ 50.46 g of AK-1 (commercially available, highly crystalline TiO$_2$ from Crenox GmbH having a crystallite size of greater than 10 nm and a BET surface area of about 90 m$^2$/g) are added over a period of 5 minutes to 196.24 g of H$_2$O. 16.07 g of ammonium paratungstate are added to the resulting 20% strength suspension while stirring and the mixture is stirred for a further 30 minutes. After addition of 6.36 g of ammonium iron citrate and stirring for 30 minutes, the suspension is evaporated to dryness (e.g. on a rotary evaporator).

Production Example X5 (Comparative Example)

Ti—Fe on Microcrystalline Titanium Oxide Hydrate According to the Invention 2244 g of a TiO(OH)$_2$ suspension (corresponding to 490 g of TiO$_2$) are admixed while stirring with 66.7 g of ammonium iron citrate and the mixture is stirred for 30 minutes. The suspension is freed of the solvent by distillation and subsequent drying in a drying oven.

Production Example X6 (Comparative Example)

Ti—Fe on Amorphous Titanium Oxide Hydrate Freshly Prepared from TiOSO$_4$ 1062.9 g of titanyl sulfate solution having a TiO$_2$ content of 9.22% are set to a pH of 7.5 by means of 25% strength ammonia solution and the precipitate obtained is filtered off and washed with water to a final conductivity below 70 µS/cm. The precipitate resuspended in water (about 20% TiO$_2$) is admixed while stirring with 12.45 g of ammonium iron citrate and the mixture is stirred for 30 minutes. The suspension is freed of the solvent by distillation and subsequent drying in a drying oven.

Production Example X7 (Comparative Example)

Ti—Fe on a Crystalline Ti Precursor 501.2 g of A-K-1 (commercially available, highly crystalline TiO$_2$ from Crenox GmbH having a crystallite size of greater than 10 nm and a BET surface area of about 90 m$^2$/g) are added to 1948.8 g of water. This about 20% strength suspension is admixed while stirring with 66.7 g of ammonium iron citrate. After stirring for 30 minutes, the suspension is freed of the solvent by distillation and subsequent drying in a drying oven.

Production Example X8 (Comparative Example)

Ti/W/V—Vanadium-Containing Comparative Product

In a 2 l round-bottom flask, 200 g of A-DW-1 (commercially available, highly crystalline TiO$_2$ from Crenox GmbH containing 10% by weight of WO$_2$ and having a crystallite size of greater than 10 nm and a BET surface area of about 90 m$^2$/g) are suspended in 1000 ml of water and admixed while stirring with 3.87 g of ammonium metavanadate. While stirring, the suspension is heated at 70° C. for 10 minutes and the solvent is subsequently removed under reduced pressure. After drying in a drying oven and calcination, the finished, catalytically active comparative material containing 1.5% by weight of V$_2$O$_5$ based on the A-DW-1 used is obtained.

Example for Determination of the Catalytic Activity

To determine the catalytic activity, a calcination of the raw materials obtained as per the production examples is carried out at 550° C. for 1 hour in a muffle furnace, resulting in conversion of the metal oxide precursors into their oxides.

To examine the aging resistance, the powders which had initially been calcined at 550° C. for one hour were subjected to a further thermal treatment at 750° C. for 48 hours in the muffle furnace.

Before use in catalytic measurements, the samples were converted by pressing, subsequent comminution and sieving into a particle size fraction having particle diameters in the range from 255 to 350 µm (sieve fraction).

The space velocity (GHSV, gas hourly space velocity) was used to quantify the throughput over the catalyst. This is defined as the ratio of total volume flow of the feed gas to the catalyst volume: GHSV=$V_{gas}/(m_{cat}/\rho_{cat})$. In this case, a total volume flow of 183.4 ml/min was passed over 75 mg of the catalyst, resulting in a space velocity GHSV of 100.000 h$^{-1}$.

In all cases, the feed gas mixture contained 1000 ppm of NO, 1000 ppm of NH$_3$ and 2% of O$_2$ in helium. Analysis of the product gas mixture was carried out by means of a combination of photometric measuring instruments (BINOS) for the detection of NO, NO$_2$ and NH$_3$.

Figure 1:
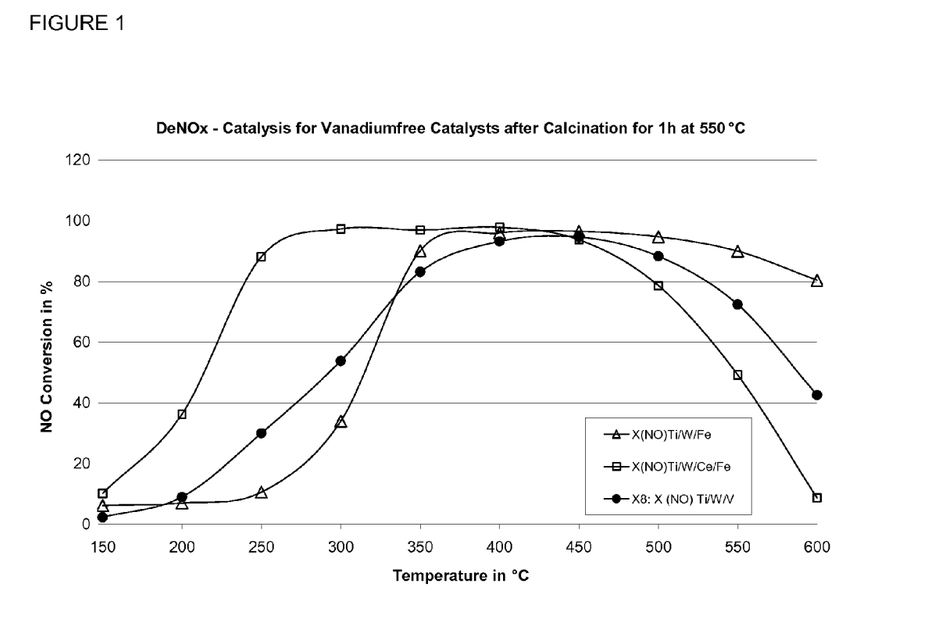
FIG. 1 shows the catalytic activity (NO conversion values) of the samples obtained in examples 1 and 2 as a function of the temperature compared to a standard material as per example X8 comprising 1.5% by weight of $V_2O_5$ on a $TiO_2/WO_3$ support containing 10% by weight of $WO_3$.
Figure 2:
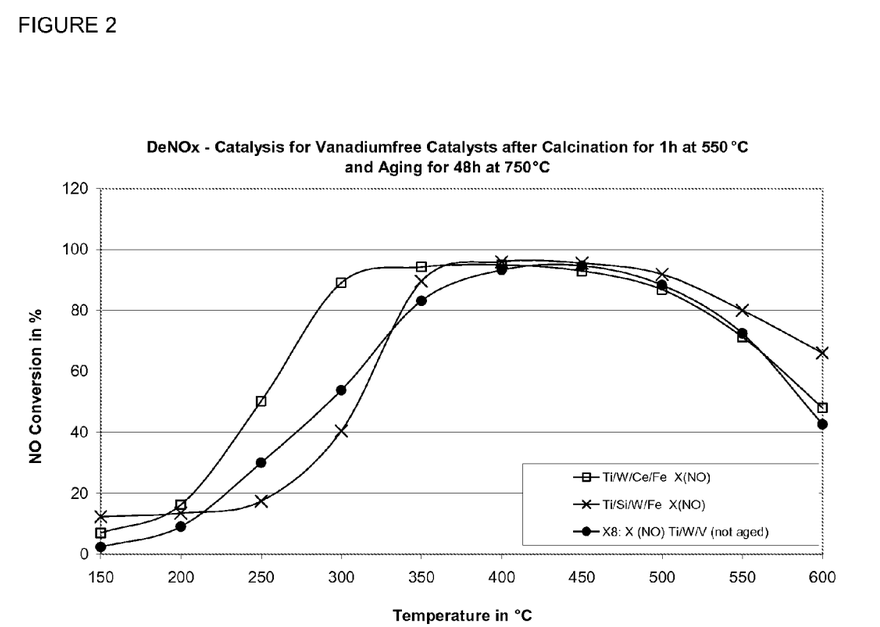
FIG. 2 shows the catalytic activity (NO conversion values) of the samples obtained in examples 1 and 2 after aging by heating to 750° C. for 48 hours as a function of the temperature compared to a standard material as per example X8.

FIGS. 1 and 2 show the NO conversion values achieved on the catalysis test setup for the samples as per examples 1 and 2 as a function of the temperature. As a comparison, the curve for a standard material containing 1.5% by weight of V$_2$O$_5$ on a TiO$_2$/WO$_3$ support containing 10% by weight of WO$_3$ is shown. It can clearly be seen in FIG. 1 that the material according to the invention having the composition Ti/W/Fe displays significant advantages over the vanadium-containing standard material as per example X8 in the upper temperature range of about 450-600° C. In the low-temperature range (about 200-300° C.), the system Ti/W/Ce/Fe displays excellent conversion values. After aging of the powders by heating at 750° C. for 48 hours (FIG. 2), slight decreases in conversion are observed for the system Ti/W/Ce/Fe in the lower temperature range. However, the conversions found are still significant above the values for the unaged comparative material as per example X8. In the high temperature range of about 450-600° C., a higher activity which is virtually identical to that of the comparative material is even observed for the system Ti/W/Ce/Fe. In the case of the system Ti/W/Fe, the introduction of SiO$_2$ gives a material which even after aging, especially in the high temperature range, displays very good catalysis values.

Figure 3:
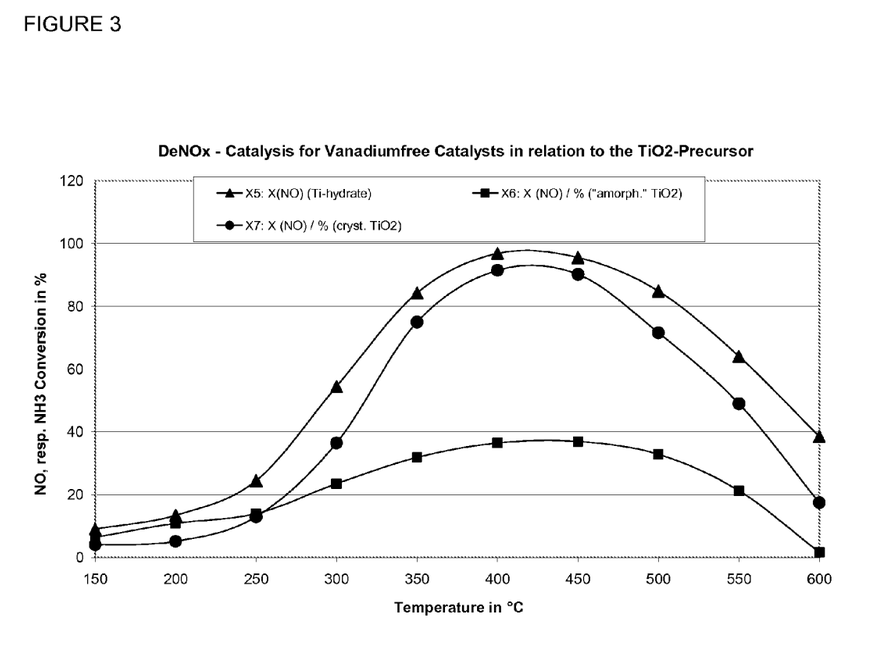
FIG. 3 shows the catalytic activity (NO conversion values) of the Ti—Fe samples obtained in example X5 on the basis of a microcrystalline anatase $TiO(OH)_2$ used according to the invention as a function of the temperature compared to Ti—Fe samples based on an amorphous $TiO_2$ (example X6) or a highly crystalline anatase $TiO_2$ (example X7).

FIG. 3 shows that the microcrystalline anatase TiO$_2$ in the form used according to the invention offers fundamental advantages compared to an amorphous or highly crystalline anatase TiO$_2$ in the production of DeNOx catalysts according to the invention. The conversion curves clearly show that significantly better values are found for the microcrystalline TiO$_2$ used according to the invention compared to systems which have an identical composition and differ only in the crystallinity of the anatase TiO$_2$ used.

The invention claimed is:

1. A composition, comprising:
a titanium compound,
an iron compound, and
a tungsten compound,
wherein the titanium compound is obtained in the production of TiO$_2$ according to the sulfate process during hydrolysis of a titanyl sulfate-containing solution and/or has a microcrystalline anatase structure,
wherein the composition has a vanadium content, calculated as V, of less than 0.15% by weight based on the solids content of the composition, and
wherein the composition has a BET surface area of greater 150 m$^2$/g.

2. The composition as claimed in claim 1, wherein the titanium compound which is obtained in the production of TiO$_2$ according to the sulfate process during hydrolysis of a titanyl sulfate-containing solution and/or has a microcrystalline anatase structure makes up more than 50% by weight of all titanium-containing components of the composition.

3. The composition as claimed in claim 1, wherein the iron compound is an organic iron compound, and/or the iron content, calculated as Fe$_2$O$_3$, is from 0.1 to 5% by weight, based on the solids content of the composition.

4. The composition as claimed in claim 3, wherein the iron compound is ammonium iron(III) citrate.

5. The composition as claimed in claim 1, wherein the tungsten content, calculated as WO$_3$, is from 2 to 30% by weight, based on the solids content of the composition.

6. The composition as claimed in claim 1, wherein the composition further comprises a cerium compound and has a cerium content, calculated as CeO$_2$, of from 0.01 to 5% by weight, based on the solids content of the composition.

7. The composition as claimed in claim 1, further comprises a Zr content, calculated as ZrO$_2$, of less than 8% by weight, based on the solids content of the composition.

8. The composition as claimed in claim 1, wherein the sulfate content of the composition is from 0.05 to 3.5% by weight.

9. The composition as claimed in claim 1, wherein a ratio of Cl/TiO$_2$ is less than 0.0005.

10. The composition as claimed in claim 1, wherein it is present in the form of a suspension or paste.

11. A process for producing a composition as claimed in claim 1, comprising mixing of a titanium compound which is obtained in the production of TiO$_2$ according to the sulfate process during hydrolysis of a titanyl sulfate-containing solution and/or has a microcrystalline anatase structure, an iron compound and a tungsten compound.

12. The process as claimed in claim 11, further comprising depositing a water-soluble iron compound and/or a water-soluble tungsten compound on the titanium compound.

13. The process as claimed in claim 11, wherein the composition has not been subjected to any thermal treatment above 300° C. before being processed to form catalysts and a BET surface area of the composition of from 100 to 500 m$^2$/g, is obtained.

14. A catalyst or catalyst raw material comprising a composition as claimed in claim 1.

15. A dimensionally stable, catalytically active solid body obtained by mixing of the composition as claimed in claim 1 with binders, plasticizers and optionally further additives, shaping of the resulting composition, and subsequent calcination.

16. The catalytically active solid body as claimed in claim 15, wherein said shaping is by extrusion.

17. A dimensionally stable, catalytically active solid body obtained by application of the composition as claimed in claim 1, optionally together with binders, plasticizers and/or further additives, to a support material and subsequent calcination.

18. A composition, comprising:
a titanium compound;
an iron compound; and
a tungsten compound,
wherein the titanium compound is selected from the group consisting of: 1) a titanium compound obtained in the production of TiO$_2$ according to the sulfate process during hydrolysis of a titanyl sulfate-containing solution, 2) a titanium compound having a microcrystalline anatase structure, and 3) a titanium compound obtained in the production of TiO$_2$ according to the sulfate process during hydrolysis of a titanyl sulfate-containing solution and having a microcrystalline anatase structure,
wherein the composition has a vanadium content, calculated as V, of less than 0.15% by weight, based on the solids content of the composition, and
wherein the composition has a BET surface area of greater than 150 m$^2$/g.

* * * * *